(12) United States Patent
Hufford et al.

(10) Patent No.: US 12,544,156 B2
(45) Date of Patent: Feb. 10, 2026

(54) DETERMINING RELATIVE ROBOT BASE POSITIONS USING COMPUTER VISION

(71) Applicant: Asensus Surgical US, Inc., Durham, NC (US)

(72) Inventors: Kevin Andrew Hufford, Cary, NC (US); Caleb Osborne, Durham, NC (US)

(73) Assignee: KARL STORZ SE & Co. KG, Tuttlingen (DE)

( * ) Notice: Subject to any disclaimer, the term of this patent is extended or adjusted under 35 U.S.C. 154(b) by 397 days.

(21) Appl. No.: 16/733,200

(22) Filed: Jan. 2, 2020

(65) Prior Publication Data
US 2020/0205911 A1 Jul. 2, 2020

Related U.S. Application Data (60) Provisional application No. 62/787,352, filed on Jan. 1, 2019, provisional application No. 62/787,301, filed on Jan. 1, 2019.

(51) Int. Cl.
*A61B 34/30* (2016.01)
*A61B 34/20* (2016.01)
(Continued)

(52) U.S. Cl.
CPC .............. *A61B 34/30* (2016.02); *A61B 34/20* (2016.02); *A61B 34/37* (2016.02); *A61B 90/361* (2016.02); *A61B 2034/2055* (2016.02); *A61B 2034/2057* (2016.02); *A61B 2034/2065* (2016.02); *A61B 2034/301* (2016.02); *A61B 2034/303* (2016.02);
(Continued)

(58) Field of Classification Search
CPC ......... A61B 34/30; A61B 34/20; A61B 34/37; A61B 90/361; A61B 90/96; A61B 2034/2055; A61B 2034/2065; A61B 2034/301; A61B 2034/303; A61B 2034/2057; A61B 2090/3945; A61B 2090/3979; A61B 2090/365; A61B 2017/00216
See application file for complete search history.

(56) References Cited

U.S. PATENT DOCUMENTS

2007/0005045 A1\* 1/2007 Mintz .................... A61B 34/37
606/1
2007/0083098 A1\* 4/2007 Stern ..................... A61B 34/35
600/407

(Continued)

*Primary Examiner* — Sean D Mattson (57) ABSTRACT

A robot-assisted surgical system comprises a plurality of robotic system components independently positionable relative to a patient in a room, at least one of the robotic system components being a robotic manipulator configured for robotic positioning of a surgical instrument in a body cavity. Other robotic system components may include a second robotic manipulator and/or a patient bed. A camera is positioned to generate an image of a portion of the room, including the robotic manipulator, or an instrument carried by the robotic manipulator as it is moved within the body. Image processing is used to detect the robotic system components on the image captured by the camera, or the tracked portion of the instrument. Once the robotic components or tracked portion of the instruments are detected in the image, the relative positions of the bases within the room may be determined.

13 Claims, 6 Drawing Sheets

(51) Int. Cl.
*A61B 34/37* (2016.01)
*A61B 90/00* (2016.01)

(52) U.S. Cl.
CPC ............. *A61B 2090/3945* (2016.02); *A61B 2090/3979* (2016.02)

(56) References Cited

U.S. PATENT DOCUMENTS

| | | | | |
|---|---|---|---|---|
| 2010/0274389 | A1* | 10/2010 | Ortmaier | A61B 34/30 |
| | | | | 700/258 |
| 2012/0307027 | A1* | 12/2012 | Popovic | B25J 9/1697 |
| | | | | 901/46 |
| 2013/0066335 | A1* | 3/2013 | Barwinkel | A61B 34/30 |
| | | | | 606/130 |
| 2015/0297313 | A1* | 10/2015 | Reiter | A61B 34/30 |
| | | | | 600/408 |
| 2017/0079722 | A1* | 3/2017 | O'Grady | A61B 90/90 |
| 2017/0245945 | A1* | 8/2017 | Zuhars | A61B 90/39 |
| 2017/0333137 | A1* | 11/2017 | Roessler | A61B 17/1703 |
| 2019/0069962 | A1* | 3/2019 | Tabandeh | A61B 34/32 |
| 2021/0153958 | A1* | 5/2021 | Meglan | B25J 5/007 |

* cited by examiner

DETERMINING RELATIVE ROBOT BASE POSITIONS USING COMPUTER VISION

BACKGROUND

In robot surgery, for coordinated motion between arms, or for automatic movements, it is often necessary to understand the relative positioning between robotic arms. For surgical robots having multiple arms that emanate from a common base, acquiring the relative position can be performed simply based on known kinematics. For surgical robotic systems in which the robotic arms are mounted on separate carts that may be individually moved, acquiring the relative positioning is more difficult.

The described invention is means of determining the relative positioning of bases of a surgical robotic system using computer vision.

Although the inventions described herein may be used on a variety of robotic surgical systems, the embodiments will be described with reference to a system of the type shown in FIG. 1. In the illustrated system, a surgeon console 12 has two input devices such as handles 17, 18 that the surgeon selectively assigns to two of the robotic manipulators 13, 14, 15, allowing surgeon control of two of the surgical instruments 10a, 10b, and 10c disposed at the working site at any given time. To control a third one of the instruments disposed at the working site, one of the two handles 17, 18 is operatively disengaged from one of the initial two instruments and then operatively paired with the third instrument. A fourth robotic manipulator, not shown in FIG. 1, may supports and maneuvers an additional instrument.

One of the instruments 10a, 10b, 10c is a laparoscopic camera that captures images for display on a display 23 at the surgeon console 12. The camera may be moved by its corresponding robotic manipulator using input from an eye tracker 21.

The input devices at the console may be equipped to provide the surgeon with tactile feedback so that the surgeon can feel on the input devices 17, 18 the forces exerted by the instruments on the patient's tissues.

A control unit 30 is operationally connected to the robotic arms and to the user interface. The control unit receives user input from the input devices corresponding to the desired movement of the surgical instruments, and the robotic arms are caused to manipulate the surgical instruments accordingly.

In this embodiment, each arm 13, 14, 15 is separately positionable within the operating room during surgical set up. In other words, the bases of each arms are independently moveable across the floor of the surgical room. The patient bed 2 is likewise separately positionable. This configuration differs from other systems that have multiple manipulator arms on a common base, so that the relative positions of the arms can be kinematically determined by the system. This application describes systems and methods for allowing for determining the relative positions of the arms and, optionally, the patient bed.

DETAILED DESCRIPTION

Concepts described this application allow the relative positions of bases of robotic arms or other robotic system components to be determined. This information is useful for certain operations of the robotic system, including coordinated motion between the manipulators arms, or for automatic movements, or for collision avoidance interventions. This is particularly useful where components of the system are not physically linked, such as where the robotic manipulator arms and patient bed are independently positionable (e.g. their bases are independently moveable between different positions along the floor of the operating room).

First Embodiments

Features of a first embodiment of a system include a camera or a collection/series of cameras positioned to capture images of at least a portion of the manipulator arms or markers/fiducials disposed on or otherwise associated with those arms. The camera or series of cameras may be mounted on any or all manipulator arms, any or all manipulator bases, and/or on a floor-, wall-, or ceiling-mounted structure or structure(s). The camera(s) used for this embodiment are preferably positioned in the operating room, outside the patient's body. See FIG. 3 in which a camera 50 is positioned on a manipulator arm.

A processor associated with the system has a memory storying a computer program that includes instructions executable by the processor to receive image data corresponding to images capture by the camera(s) and to executes a computer vision algorithm to recognize robotic manipulators/arms or the markers/fiducials associated with those arms.

Figure 2A:
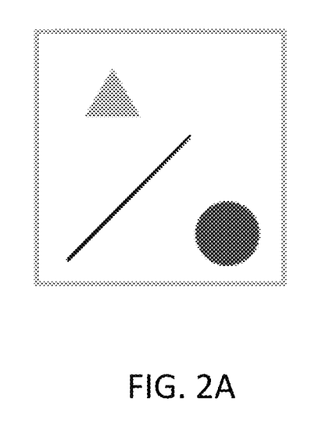
FIG. 2A shows an example of a simple marker/fiducial that may be used in the methods and modes of operation described herein.
Figure 2B:
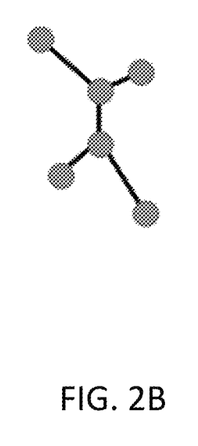
FIG. 2B shows a second example of a marker or fiducial.

The processor may calculate a transformation matrix (pose/position and orientation) between the camera and the robotic manipulators/arms, to a global coordinate system, and/or between the bases of the robotic manipulators/arms.

Where markers are used with the system, they may comprise any of the following: Active light emitting elements, to include colored or infrared (IR) emitters, such as LEDs; passive retroreflective markers; passive colored structures; 3D or 2D structures of known shape; fiducials; QR codes; data matrix codes. Any combination of the above types of markers may be also be used. FIG. 2A shows an example of a simple marker/fiducial in which various colors and or shapes may be combined to aid in computer vision segmentation, identification, and determination within a wide-angle view of an operating room. The exterior border of the fiducial may also be used. FIG. 2B shows a second example of a marker or fiducial. This can be a simple fiducial, or it may include active emitters or retroreflective elements at any or all of the dots shown. The dots may also be of different colors. The relative positions of the dots and the distance between them may be used to determine the distance from the measurement camera as well as to identify the unique fiducial itself, which may be used to identify a specific manipulator. As three points define a plane, this may be considered the minimum, however four or more may be used to provide some robustness as well as better visibility for non-orthogonal viewpoints.

The apparent size of the marker and any distortion or skew of the marker are then used to determine either or both of distance and orientation from a given camera.

Techniques that may be used for feature detection/classification/identification, may include, but are not limited to edge detection, Hough transform, Circlet transform, implicit shape models, statistical shape models.

Figure 1:
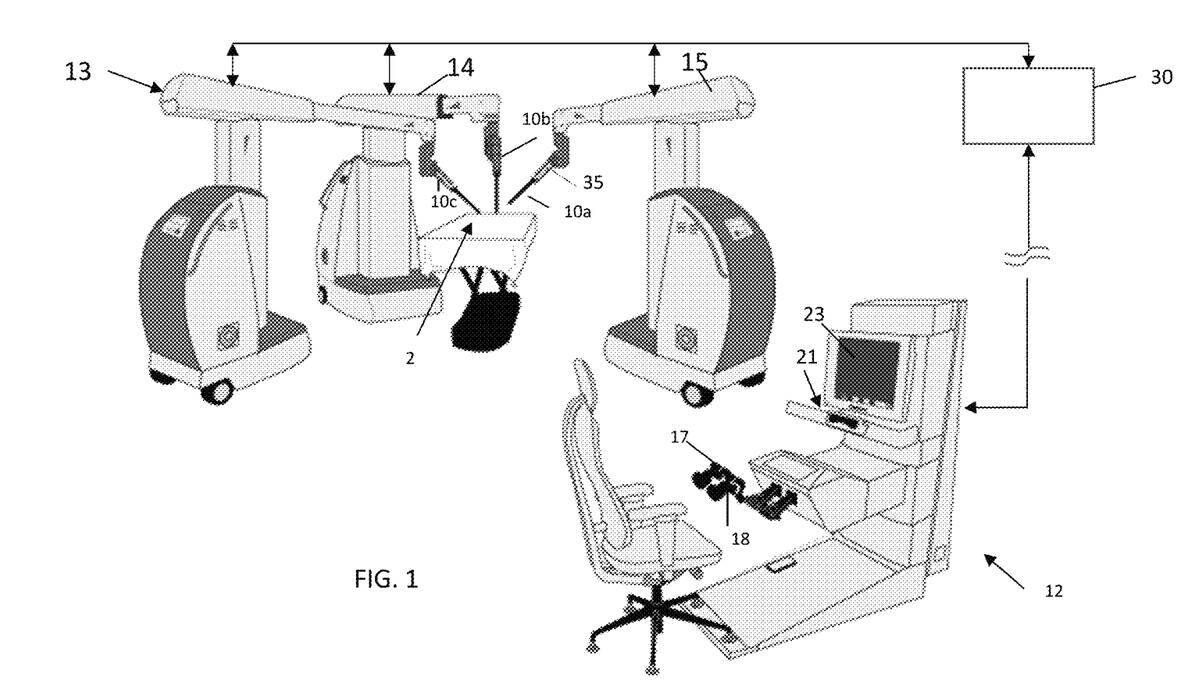
FIG. 1 illustrates a surgical robotic system that may incorporate methods and modes of operation described herein.

In one implementation, a 3-dimensional marker having active emitters is mounted to the end of the prismatic element (see the distal part of the horizontal members of the arms of FIG. 1) of the robotic arm. Further, this marker may be underneath an exterior cover (which may be a sterile drape) that is transparent, translucent, or at a minimum at least partially transparent to infrared light.

Figure 3:
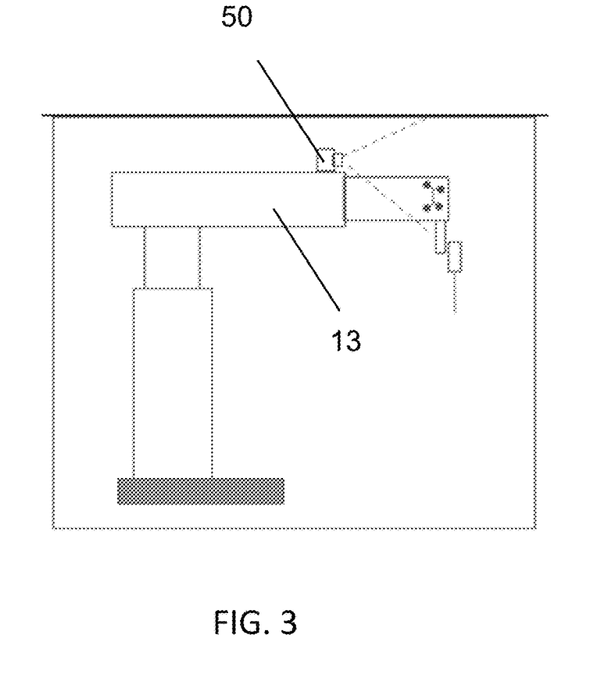
FIG. 3 shows one embodiment of a manipulator arm having features useful for the methods and modes described in this application.

FIG. 3 shows a marker underneath the cover of a portion of the manipulator arm as well as a camera mounted to a portion of the manipulator arm. This marker may be mounted exterior to the cover instead as well.

Some manipulator arms include lights that emit light of multiple colors in order to communicate system or manipulator arm status to the surgical staff. Because these lights are in known positions relative to one another, they may be used by the system as a type of marker.

Figure 4:
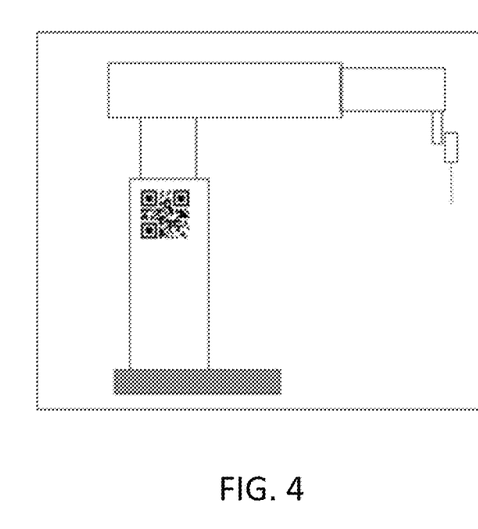
FIG. 4 shows a second embodiment of a manipulator arm having features useful for the methods and modes described in this application.

In a second embodiment shown in FIG. 4, a fiducial is mounted to a rigid part of the manipulator's base. The location of this fiducial relative to the other portions of the robot is known, thus the extents of the robot may be inferred from the robot dimensions/kinematics. In other embodiments, the system's logo, other markings, the profile of the manipulator, its base, or any combination thereof may be recognized and used in the methods described here.

Using any of the markers and their known location to the manipulator, the location of the base and end of the end effector and even the attached tool may then be determined by the known robot dimensions and kinematics.

The use of infrared emitters described above not only allows for use without creating a visual distraction for the user, but also allows the use of such markers unimpeded by a sterile surgical drape which is largely or mostly transparent to infrared wavelengths.

The marker or an additional marker or series of markers may also be mounted on or in the end effector unit 35 (FIG. 1) of the manipulator arm, known in the Senhance Surgical System as the LIA, that receives and supports the surgical instrument used in the procedure. This may provide some redundancy and/or visibility to cameras that may be mounted elsewhere, such as in the LIA itself.

This technology may also be used for live tracking of manipulators, and maybe even to alert of a potential collision.

Further markers or similar configurations may be used to determine the relative position/orientation of the patient bed/operating table 2 relative to one or more of the manipulators.

Multiple cameras with multiple viewpoints that may or may not be mounted to the same structure are within the scope of this invention.

Similar means may be used to provide absolute positioning in an operating room, to include either or both of: (1) markers/fiducials or structures in the operating room with cameras mounted on the surgical robotic system—even ceiling lights/grids may be used as a reference/landmarks, especially if visible to multiple cameras for relative referencing, or (2) cameras mounted external to the robot system as previously described.

It can be challenging to provide an adequate training set for a computer vision algorithm Thus, as the system is used in varying conditions and configurations, the varying appearance of the markers in those varying conditions and poses of the manipulator arms may be used as inputs to machine learning/artificial intelligence algorithms or other processing to further enhance the computer vision algorithm.

In addition, as the manipulators move through their motion range, the higher-resolution feedback of the encoders as well as other data may be used to adjust and improve the relative base position calculations.

In alternative embodiments, the image may be one captured by an endoscope 10b (FIG. 1) attached to a robotic arm but still positioned outside the patient's body. The image is processed in order to identify characteristics of the surgical setup, including:

i. The orientation of the patient or operating bed relative to the endoscope, including translational and rotational (including tip/tilt of the operating bed)
ii. The location of the instrument trocars relative to the endoscope trocar, patient anatomy and endoscope robotic arm absolute position.

From this information, the system may be used to determine: (a) the expected orientation of anatomy upon entry into the patient; (b) the 3D superimposition of target anatomy (e.g. tumors, gallbladder, etc.) on the patient based on previous imaging. This might be used to match the patient's anatomy with previously gathered imaging data for augmented-reality superimposition of target anatomy; (c) the 3D workspace can be constructed, including the relative centers of motion of all of the robotic arms, located at the respective incision sites The system and methods are described with respect to determining relative positions of the manipulator bases. The term "base" is broadly used to mean a portion of the robotic manipulator that is not robotically moved during the course of the surgical procedure. However, in some embodiments, the system and methods can be used to determine the relative positions of other parts of the robotic manipulators including those that are robotically moved during the procedure (as noted above).

The system features, modes of operation and methods of the first embodiments provide a number of advantages:
 they allow the relative position of two robotic bases may be determined
 determination of relative positions of the robot bases can provide information to the system for robot setup assistance, semi-autonomous motions, 3D modeling, or other techniques.

Second Embodiments

Second embodiments use images captured by the endoscope 10b on one of the arms 13, 14, 15 to determine the relative positions of its robot bases and the method of performing that determination.

Figure 5:
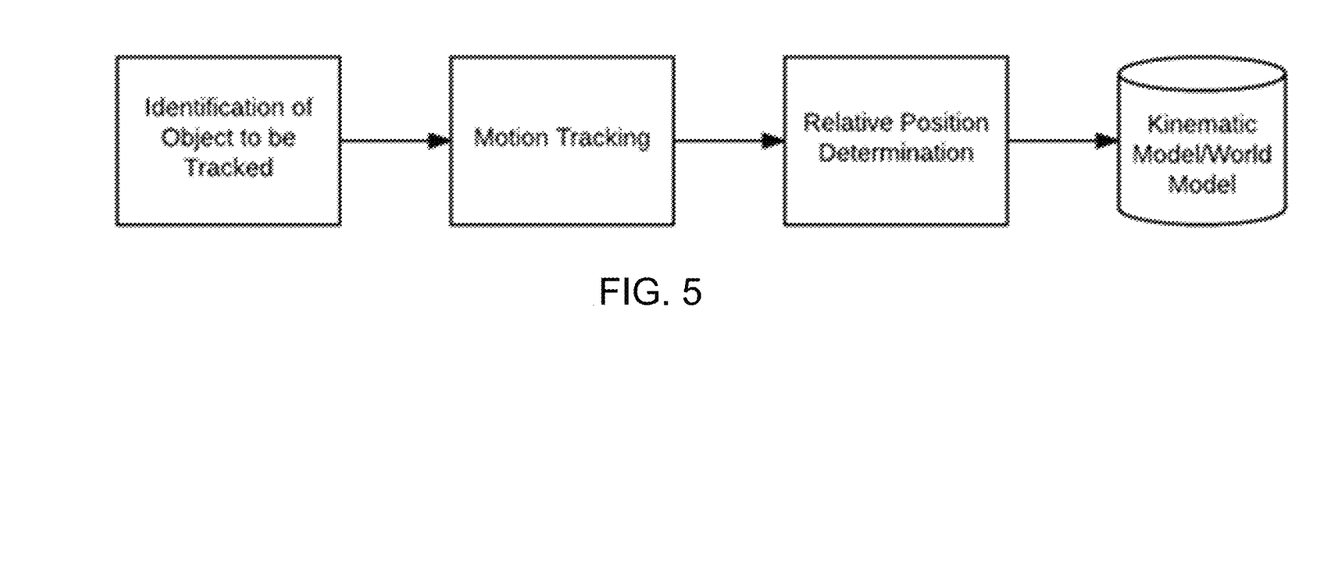
FIG. 5 is a block diagram illustrating steps for identifying relative robot base positions based on instrument recognition in the endoscopic view.

As depicted in the flow diagram of FIG. 5, an object to be tracked is identified and tracked by a camera through a motion or sequence of motions. From those motions, the relative transformation between two robotic manipulator arms is determined.

As an example, one robotic manipulator arm may hold an instrument inserted through a trocar into the abdomen, while another robotic manipulator arm may hold an endoscope with a view of the instrument tip. The robotic manipulator arm holding the instrument may perform a series of small moves which are tracked via the endoscope. The motions of the tracked instrument tip seen on the endoscope camera's sensor plane(s) are mapped to the motions of the robotic manipulator holding said instrument. The transformation matrix between these two measurements may then be directly extracted.

Further refinements may be performed with multiple motions and/or different vantage points to improve the accuracy. This may be performed with any additional robotic manipulator arms in the system, and the results are stored in a kinematic model of the overall system that may be used for a variety of purposes. This may further be mapped into an overall "world" model that may include positional data about the surgical site and/or the operating room.

Known motions, controlled by the surgical robotic system provide an opportunity for improved accuracy and calibration. Upon recognition of the instruments, a sequence of known motion profiles may be performed, and the outcome of the motions tracked on the camera's sensor plane (2D or 3D) may then be used to extract the relative transformation matrices.

These motions may include, but are not limited, to:
Roll, pitch, yaw, insertion
X, Y, Z, roll
Motions in 6-DOF Cartesian space
4-DOF motions which fully define pose because the trocar defines 2-DOF
(6-DOF motions and trocar-less motions are also within the scope of this invention)

In some implementations, the robotic arm holds an instrument and moves within the camera view, and the robotic arm holding the instrument remains static.

In some implementations, the robotic arm holding the endoscope also moves, with either a static or moving instrument within the view to provide additional tracking data and relative positioning data.

For image segmentation, instrument recognition, and instrument tracking, the computer vision techniques described in U.S. application Ser. No. 16/237,418, "Use of Eye Tracking to aid in Identification and Tool Assignment" which is incorporated herein by reference may be used. In addition, the use of eye-tracking described in that application for providing user input to assist with instrument assignment and identification may be used in methods described here as well.

Standard laparoscopic instrumentation may be tracked and used in the invention; however, the accuracy may be improved through the use of a known object better suited for tracking. See FIGS. 6-9.

Figure 6:
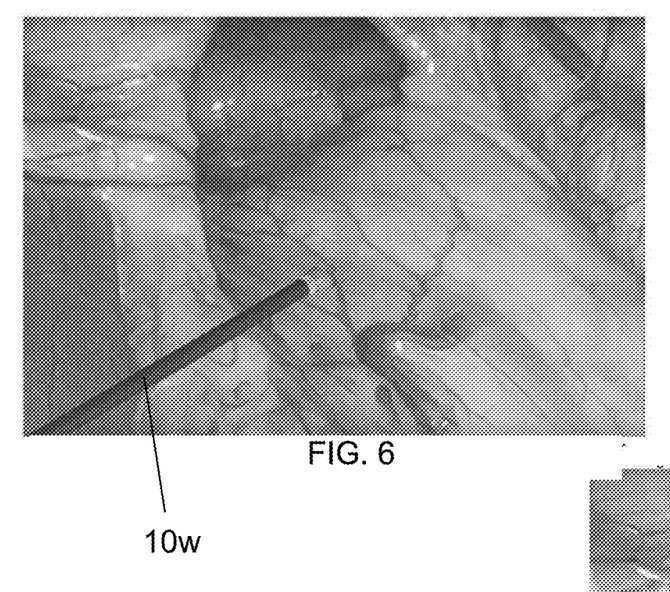
FIGS. 6 through 9 show a camera image in which a surgical instrument having markings suitable for use in the second embodiments are positioned.

FIG. 6 shows that an identifiable instrument 10w may be a rigid shaft having a sphere of known size and color positioned on its distal tip.

Figure 7:
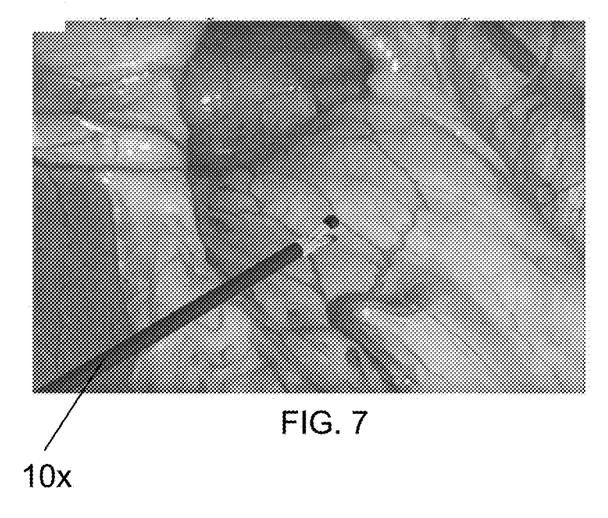

FIG. 7 shows a jawed instrument 10x having two spherical or hemispherical targets, potentially of different or contrasting colors. This configuration is useful for determining roll orientation of the instrument. The jaws create a line of known length when open □ defines a vector rotating in space. The length and orientation of the relative vector gives additional information.

Figure 8:
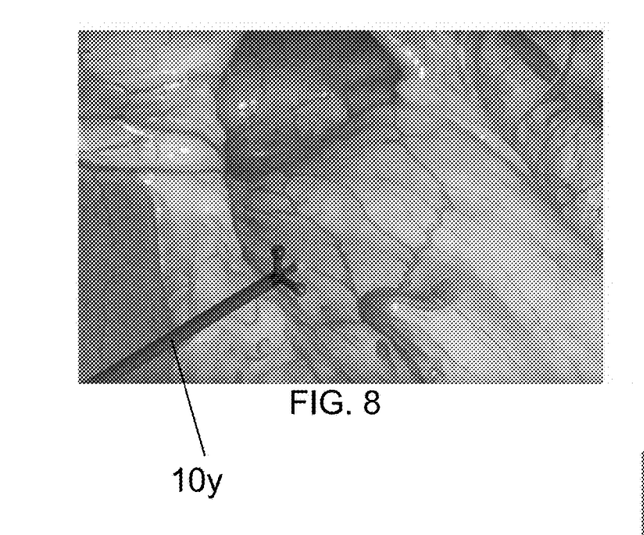

FIG. 8 shows an identifiable instrument 10y having identifiable markers that define multiple axes. Shown is a three-marker configuration which define three orthogonal axes.

The markers may be spherical or hemispherical markers of differing or contrasting colors.

Figure 9:
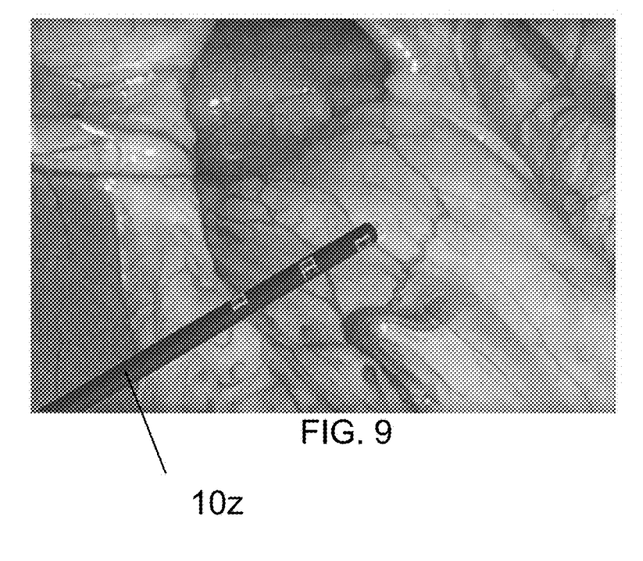

FIG. 9 shows an identifiable instrument that may have a marking or series of markings along its length. These markings may be on either side, or as shown rotationally dispersed, which provides positional and rotational information. In this case a series of markings are shown. These may be Data Matrix codes, QR codes, lines, bar codes, absolute reference markings, etc. or simply visible markings. The helically positioned markings shown in FIG. 9 give both positional and rotational information, especially if they are unique and may be identified by the camera.

In some implementations, relative distances and orientations between markers as well as their perceived size provides sufficient information.

In some implementations, any combination of: prescribed motions, user-generated motions, fiducial/marker size, fiducial/marker features, fiducial/marker relative distances are used to provide information about the relative position and orientation of the robot bases to each other.

In some implementations, the user may be prompted or guided by UI overlays, audible prompts, etc. in completing calibration steps or in performing certain motions or directions of motions.

The addition of other imagers, image-tracking techniques, shape determination techniques, and depth measurement techniques in the abdominal space to assist with identification and tracking of the instruments is also within the scope of this invention.

In some implementations, an external camera or number of cameras may be used to track the movement of at least one robotic manipulator. Similar to the endoscopic implementations shown above, objects of known size and shape or markings, both of which may loosely be described as fiducials may be used to identify objects to be tracked and/or improve the tracking accuracy.

In other embodiments, computer vision using input from an image sensor or camera positioned outside the body may be used to determine the relative positions of the robot bases or other features of the surgical setup. Such other features may include the orientation of the patient relative to the endoscope, including translational and rotational (e.g. tip/tilt of the operating bed), and the location of the instrument trocars relative to the endoscope trocar, patient anatomy, and the endoscope robotic arm absolute position.

The disclosed methods provide the system with the ability to determine relative robot base positioning, which may be used to provide enhanced system capabilities (safety, position lockouts, go/no go zones, autonomous or semi-autonomous actions)

In describing the relative positioning between robotic arms, the word positioning may mean just position, or it may mean both position and orientation, sometimes referred to as pose. This relative pose may be described by a transformation matrix.

Concepts that may be incorporated into the system and methods described here are including in the following co-pending and commonly owned application, which is incorporated by reference:

U.S. application Ser. No. 16/732,303 ("Identification and Assignment of Instruments in a Surgical System Using Camera Recognition") (Ref: TRX-13600R);

All patents and applications referred to herein, including for purposes of priority, are incorporated herein by reference.

What is claimed is:

1. A robotic surgical system, comprising:
   at least two robotic manipulators, each of the at least two robotic manipulators including a base and a manipulator arm supported by the base, the base of each manipulator arm of the manipulator arms independently moveable across a floor in a room for placement of the base and corresponding manipulator arm in a desired position with respect to a patient bed, and each of the manipulator arms moveable relative to its corresponding base for robotic positioning of a corresponding surgical instrument in a body cavity;
   a plurality of light emitting elements on the manipulator arm of each of the at least two robotic manipulators, wherein the plurality of light emitting elements are configured to operate both as computer vision tracking markers and as selectively illuminated status or function indicators,
   at least one camera on the manipulator arm of each of the at least two robotic manipulators;
   wherein the system is configured
   to selectively illuminate light emitting elements in the plurality of light emitting elements to provide a visual alert to a user as to a status or function of the robotic surgical system, wherein the status or function is determinable by the user based on the user's direct observation of the illuminated light emitting elements;
   receive image data obtained using the at least one camera on each manipulator arm of the at least two robotic manipulators, the image data including image data related to the plurality of light emitting elements, and to determine, using the image data related to the plurality of light emitting elements, relative positions of respective bases of the at least two robotic manipulators.

2. The system of claim 1, wherein the at least two robotic manipulators comprise a first robotic manipulator and a second robotic manipulator, wherein the at least one camera on the manipulator arm of the first robotic manipulator is positioned to capture images of at least a portion of the manipulator arm of the second robotic manipulator.

3. The system of claim 2, wherein the first robotic manipulator and the second robotic manipulator include markings and wherein the image data includes image data related to the markings.

4. The system of claim 3, wherein the markings include logos.

5. The system of claim 1, wherein at least one of the plurality of light emitting elements is an infrared element.

6. The system of claim 1, wherein each manipulator arm of the at least two robotic manipulators includes a plurality of status or function indicators, wherein said plurality of status or function indicators comprises the plurality of light emitting elements, and wherein the image data includes image data related to the plurality of the status or function indicators.

7. A method of determining relative positions of robotic system components, comprising:
   providing a first robotic manipulator and a second robotic manipulator, the first robotic manipulator including a first base and a first manipulator arm supported by the first base, and the second robotic manipulator including a second base and a second manipulator arm supported by the second base, the first and second bases independently moveable in a room, the first and second manipulator arms each configured for robotic positioning of a corresponding surgical instrument in a body cavity, each of the first robotic manipulator arm and the second robotic manipulator arm including a plurality of light emitting elements, the plurality of light emitting elements configured to operate both as computer vision tracking markers and as selectively illuminated status or function indicators;
   selectively illuminating light emitting elements in the plurality of light emitting elements to provide a visual alert to a user as to a status or function of the robotic system, wherein the status or function is determinable by the user based on the user's direct observation of the illuminated light emitting elements;
   using a first camera on the first robotic manipulator arm, capturing at least one image of at least the second robotic manipulator arm;
   using a second camera on the second robotic manipulator arm, capturing at least one image of at least the first robotic manipulator arm;
   using image data from the at least one image of at least the first robotic manipulator arm and the at least one captured image of at least the second robotic manipulator arm, said image data including image data related to the plurality of light emitting elements, determining relative positions of the first robotic manipulator and the second robotic manipulator.

8. A robot-assisted surgical system comprising:
   a first robotic manipulator and a second robotic manipulator, each of the first robotic manipulator and the second robotic manipulator including a base and a manipulator arm supported by the base, the base of each of the first and second robotic manipulators independently moveable in a room, and each of the manipulator arms of the first and second robotic configured for robotic positioning of a corresponding surgical instrument in a body cavity,
   a first camera on the manipulator arm of the first robotic manipulator for generating a first image of a portion of the room including the second robotic manipulator;
   a first plurality of light emitting elements on the manipulator arm of the first robotic manipulator, the first plurality of light emitting elements configured to operate both as computer vision tracking markers and as selectively illuminated status or function indicators
   a second camera on the manipulator arm of the second robotic manipulator for generating a second image of a portion of the room, including the manipulator arm of the first robotic manipulator;
   a second plurality of light emitting elements on the manipulator arm of the second robotic manipulator, the second plurality of light emitting elements configured to operate both as computer vision tracking markers and as selectively illuminated status or function indicators
   at least one processor and at least one memory, the at least one memory storing instructions executable by said at least one processor to:
   selectively illuminate light emitting elements in the first plurality of light emitting elements and in the second plurality of light emitting elements to provide a visual alert to a user as to a status or function of the robot-assisted surgical system, wherein the status or function is determinable by the user based on the user's direct observation of the illuminated light emitting elements;
   detect using image processing the second plurality of light emitting elements on the first image, detect using image processing the first plurality of light emitting elements on the second image, and determine relative positions of the first robotic manipulator and the second robotic manipulator.

9. The system of claim 8, wherein the first camera on the manipulator arm of the first robotic manipulator is positioned to capture images of at least a portion of the manipulator arm of the second robotic manipulator.

10. The system of claim 9, wherein the manipulator arm of the first robotic manipulator and the manipulator arm of the second robotic manipulator include markings and wherein the first and second images include image data related to the markings.

11. The system of claim 9, wherein the first and second images include image data related to the first and second plurality of light emitting elements.

12. The system of claim 11, wherein at least one of the light emitting elements of the first and second plurality of light emitting elements is an infrared element.

13. The system of claim 11, wherein each of the first robotic manipulator and the second robotic manipulator includes a plurality of status or function indicators, wherein said plurality of status or function indicators comprises the first and second plurality of light emitting elements, and wherein the image data includes image data related to the plurality of the status or function indicators.

* * * * *